June 6, 1933. F. M. GOLON ET AL 1,912,633
DEVICE FOR SUPPORTING FRANKFURTERS OR SAUSAGE
LINKS WHILE BEING SMOKED OR CURED
Filed Feb. 10, 1932
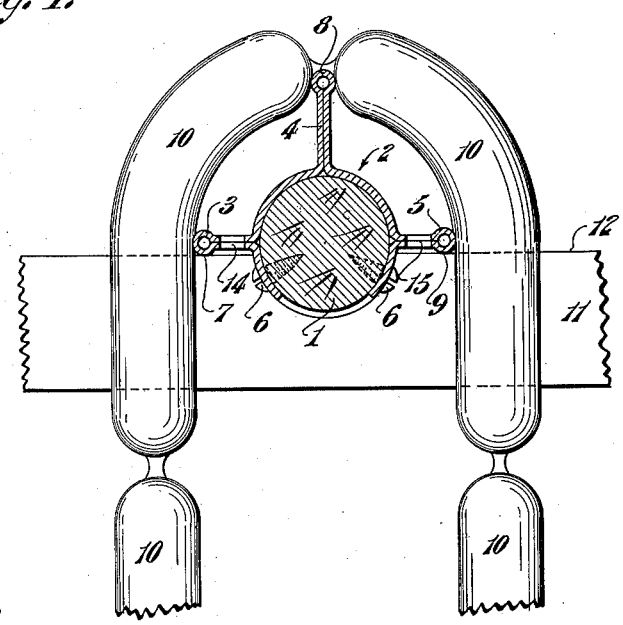
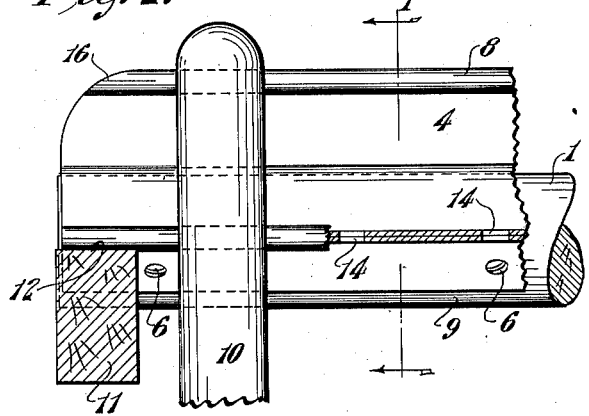
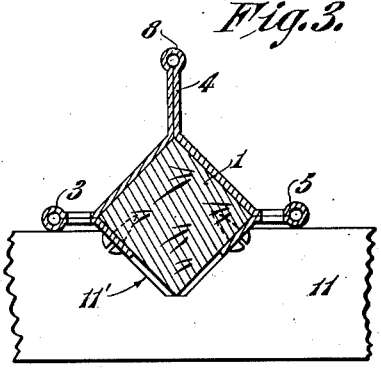
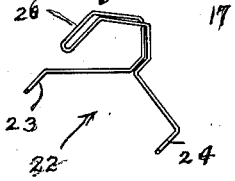
INVENTORS,
Frank M. Golon,
Adolf Morawski,
Andrew Krason,
BY Harry W. Bowen
ATTORNEY.

Patented June 6, 1933

1,912,633

UNITED STATES PATENT OFFICE

FRANK M. GOLON, ADOLF MORAWSKI, AND ANDREW KRASON, OF SPRINGFIELD, MASSACHUSETTS; SAID MORAWSKI AND SAID KRASON ASSIGNORS TO SAID GOLON

DEVICE FOR SUPPORTING FRANKFURTERS OR SAUSAGE LINKS WHILE BEING SMOKED OR CURED

Application filed February 10, 1932. Serial No. 592,076.

This invention relates to improvements in devices for supporting frankfurters or sausage links while being smoked or cured.

Heretofore, the supporting device for curing or smoking sausage links, or frankfurters, consisted of rods with the result that the article being cured is left with uncured portions, where the article rests on the rods. In other words, it leaves the enclosing sack or skin of the frankfurters and sausage links with white spots, which readily spoil after the article has been removed from the rods.

An object of the present invention is, therefore, to overcome this serious objection and provide a means for supporting the article in more than one point, namely, three; and to provide the supporting portions of the device with a very small surface, or area, in order that the heat, or smoke, will come into direct contact with the entire surface of the frankfurters, or other articles being cured.

Broadly, our invention comprises a one-piece metal member which is formed with three outwardly extending arm portions, arranged radially of the center of the device. The horizontal arm portions are formed with openings therethrough, that permit the smoke to pass through the same in an upward direction, to the inner surfaces of the suspended frankfurters.

Means is provided for preventing the device from turning laterally, when it is in use, or supporting the frankfurters.

Referring to the drawing:

Fig. 1 is a transverse sectional view on the line 1—1 of Fig. 2, showing the three radially extending arm portions, the interiorly supported rod and in outline, a frankfurter.

Fig. 2 is a side view of a portion of the complete device showing the openings in one of the horizontal flanges.

Fig. 3 is a sectional elevational view of a modification in section, illustrating a means for supporting the device at the ends.

Fig. 4 is a further modification, and

Figs. 5, 6, and 7 show detachable securing devices for the supporting rod.

Referring to the drawing in detail:

1 designates the supporting rod to which is secured the device, indicated as a whole by the reference numeral 2, which comprises the three outwardly extending arm members 3, 4, and 5, that are folded upon themselves. The member 2 is formed from a single piece of bendable material, as sheet aluminum, or any other suitable material that will not rust or corrode. The member 1 is secured to the part 2 by means of the screws 6. It will be noticed that the member 2 is formed by bending the arm portions 3, 4, and 5 upon themselves, towards each other for the purpose of providing a rigid structure. The extreme ends of these arm portions are preferably formed into circles of small radii or curved surfaces, as indicated at 7, 8, and 9. This construction is for the purpose of providing surfaces that will not catch, or obstruct the removal of the frankfurters, nor will they obstruct when being put in place on the device; the frankfurters are indicated by the numeral 10.

For the purpose of supporting the curing device, the rod 1 is set into notches formed in the supporting members 11, as shown in Fig. 2, and the side arm members 3 and 5 rest directly on the upper surface 12, whereby the device is prevented from turning, when loaded for use. This is clearly shown in Fig. 1. The recessed part, for receiving the rod 1, may be formed V-shaped, as shown in Fig. 3, where the device is illustrated as being rectangular in cross section, instead of round. The rectangular recessed part in this figure is indicated at 11'. Fig. 4 illustrates a further modification, in which the supporting member 1' is formed as a triangle in cross section and rests directly on the upper surface 12, as shown. The three arm members 3, 4, and 5 are secured to the member 1 with the screws 13. The lateral arms 3 and 4 are formed with openings 14 and 15, for the purpose of allowing the smoke and heated air to pass upward to the inward surfaces of the frankfurters. The end of the vertical arm 4 is formed with a curve, indicated at 16, for the purpose of preventing the frankfurters from catching on the ends, when they are put in place, or removed therefrom.

It will be seen, from Fig. 1, that the frankfurters are supported on the arm 4 and are spread outwardly by means of the arms 3 and 5 laterally arranged, and there is a free open space between the ends of the arms 3 and 5 to permit the hot air to pass upward and then outward, between the frankfurters 10.

It is to be understood that we do not limit ourselves to any particular kind of metal of which the part 2 is composed, or any particular shape, or length, of the supporting rod 1.

Referring to Fig. 5, which shows a modification for quickly removing the supporting rod 1 from the member 2, when it is necessary to thoroughly clean the rod after being in use for some time, 17, (see Fig. 7), indicates a member formed with the three arm portions 18, 19, and 20. The arms 18 and 19 loosely enter openings in the ends of the rod 1; the arm 20 enters the opening 21 in the arm member 4. When it is desired to remove the rod 1 from the member 2, it is only necessary to withdraw the member 17, whereby the rod and member 2 can be readily separated for cleaning.

In Fig. 6, is shown a further modification of the connecting member for the construction shown in Fig. 4, indicated at 22. The arms 23 and 24 enter the openings 25 in the arms 3 and 5 and the arm 26 enters an opening 27 in the rod 1'. This member, 22, may be readily removed when it is desired to clean the rod and the arms 3, 4, and 5. The use of the screws 6 is objectionable. We, therefore, prefer to employ the construction shown in Figs. 6 and 7, for removably attaching the rods 1 and 1' to the frankfurter supporting members 3, 4, and 5.

It is apparent that the member 17 may be employed in Fig. 3.

In Fig. 4, the arms 3 and 5 are shown folded close together to provide small ends 3' and 5'. In Figs. 1, 2 and 3, these arms may, if desired, be so folded.

What we claim is:

1. A frankfurter supporting device for curing purposes, the same comprising a member having arm portions folded upon itself and radially arranged with reference to its center, some of the arms having openings therethrough, end supports for the device comprising members having recesses, a part located in the recesses and extending through the said member, some of the arms being located on the supports for preventing rotation when the device is loaded with the articles to be cured.

2. In combination, a frankfurter supporting device comprising a folded one-piece member having a plurality of supporting arms with rounded ends, a rod for supporting the device at its opposite ends, means for removably attaching the rod to the supporting device, said means comprising a member with extensions or arms which connect the rod and the frankfurter supporting device.

3. In combination, in a frankfurter supporting device, a pair of spaced supports formed with a recess in each of their upper surfaces, a member located in the recesses for supporting the frankfurters, a member formed with lateral arm portions having smoke passages formed therein and supported on the said recessed supports, the arm portions serving to prevent turning movement on the supports, the construction and arrangement being such that the depending end of the frankfurters will be hung in spaced relation to each other and the said passages permitting the smoke to pass upward to the inner surfaces of the frankfurters, as described.

FRANK M. GOLON.
ADOLF MORAWSKI.
ANDREW KRASON.